July 24, 1962 A. W. CAPS ET AL 3,045,540
AUTOMATIC COPYING CAMERA
Original Filed April 29, 1955 9 Sheets-Sheet 3

INVENTORS.
ARTHUR W. CAPS AND
ADAM N. RITTINGER
BY
THEIR ATTORNEY

Fig. 21

INVENTORS.
ARTHUR W. CAPS AND
ADAM N. RITTINGER
BY
THEIR ATTORNEY

United States Patent Office 3,045,540
Patented July 24, 1962

3,045,540
AUTOMATIC COPYING CAMERA
Arthur W. Caps, Rochester, and Adam N. Rittinger, Irondequoit, N.Y., assignors to Photostat Corporation, Providence, R.I., a corporation of Rhode Island
Continuation of application Ser. No. 504,850, Apr. 29, 1955. This application Aug. 29, 1958, Ser. No. 758,164
16 Claims. (Cl. 88—24)

This invention relates to mechanism for feeding and cutting off a web of sheet material in photographic copying machines and the like, and more particularly automatic machines such as those which expose and process photographs automatically, one object being the provision of a more practical machine of this nature.

Photographic copying machines of this description generally comprise means for holding a web or roll of photographically sensitized sheet material in the focal plane, optical components for focusing an image on the sheet material, means for feeding the sheet material into the focal plane for exposure, means for removing the exposed photographic material from the focal plane, and means for developing and processing the exposed material.

Machines of this nature are generally used for copying documents. Since it is often desirable to reproduce both sides of a document such machines often utilize photographic materials sensitized on both sides. In this case, means are desirable for reversing the position of the sensitized material for exposure of the rear surface, and the provision of such means is another object of this invention.

It is desirable that the operations of winding, exposing, reversing, developing, and processing can be carried out automatically without intervention of the operator. For this reason, suitable interlocking control means are desirable to synchronize the various parts of the machine in order to carry out the steps automatically, and provision of such a system is another object of this invention.

Copying machines of this nature generally are provided with spools of sensitized paper and it is necessary that the sensitized material be protected from light prior to exposure. Further, since such spools of sensitized paper are large and bulky, it is desired that the loading of this material in the machine be facilitated as much as possible. For such reasons, other objects include the provision of a light tight paper magazine and one which is also easily opened for convenient loading of spools of paper.

It is often desirable to use machines of this nature for reproducing documents of varying sizes. For this reason, another object of this invention is the provision of adjustable parts adapted to take paper of varying widths, and the provision of means for varying the length of paper exposed during each operation.

Cameras of this nature have performed numerous operations such as winding and cutting of paper, and the mechanisms that do this have been generally complicated and required a plurality of motors. Therefore, another object of this invention is the provision of a simplified mechanism to perform these multiple functions, and the provision of a transmission capable of using one motor to perform both the winding and cutting functions.

Other objects include the provision of photographic copying machines which are more simple and practical in construction, more readily manufactured, and more efficient and convenient in operation than those heretofore in use.

This application is a continuation of application Serial No. 504,850, filed April 29, 1955, and now abandoned.

To these and other ends the invention resides in certain improvements and combinations of parts, all as will be hereinafter more fully described, the novel features being pointed out in the claims at the end of the specification.

Figure 1:
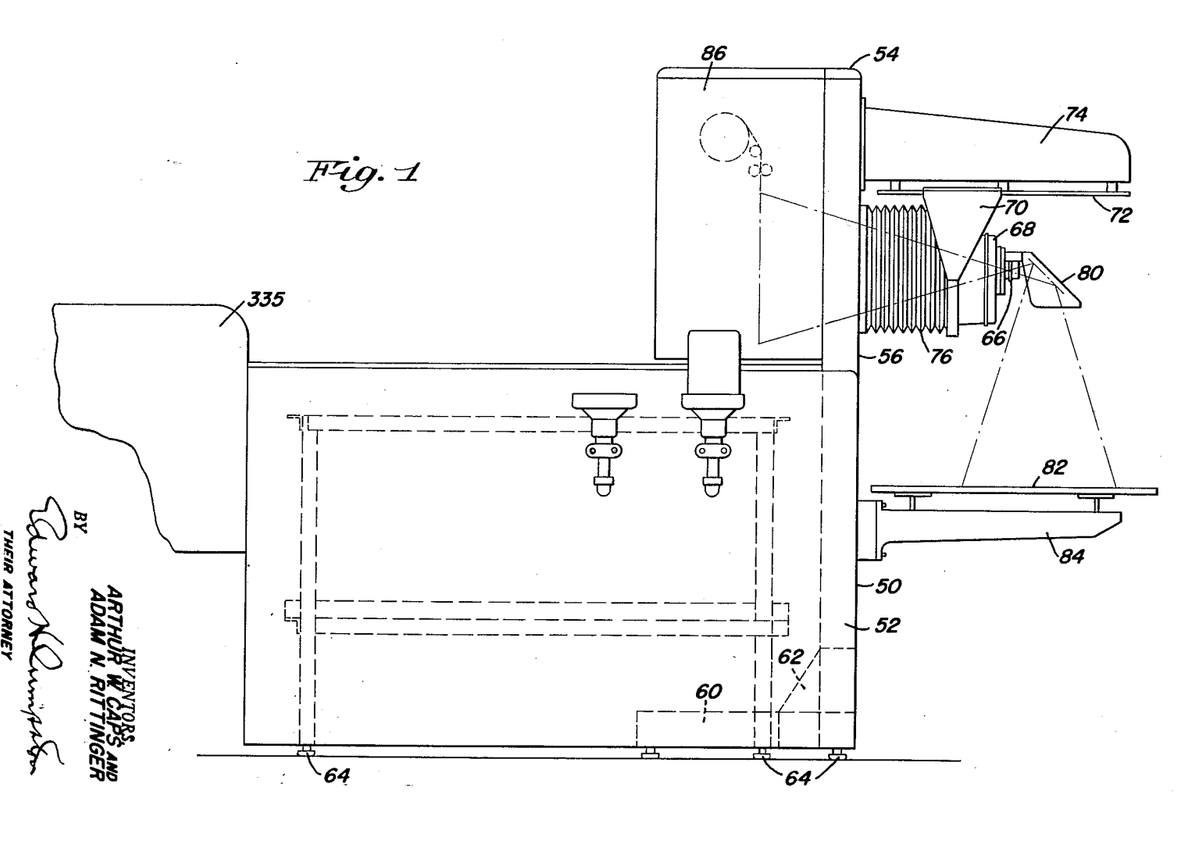
FIG. 1 is a side elevation of a photographic copying camera embodying this invention.

A photographic copying camera embodying this invention is shown generally in FIG. 1 as illustrative of the principles involved. The camera may be generally described as comprising a frame means for supporting the operative parts, optical means for focusing an image, a paper magazine for storing and supplying paper, winding means for supplying paper, cutting means for severing the exposed sheet, and processing means for developing the exposed photograph.

The supporting frame 50 comprises two vertically extending channel members 52 (FIG. 1) rigidly connected by a horizontal cross member 54, a front plate 56 (FIG. 2) and a rear plate 58. A pair of rearwardly extending horizontal channel members 60 are rigidly fastened to the lower end of the channels 52 by means of gussets 62 and are provided with leveling screws 64 for supporting and leveling the frame in vertical position.

The optical components of the camera comprise a lens and mirror assembly mounted on the front plate 56 and connected thereto by a bellows. The lens 66 is mounted on a lens board 68 which is supported in turn by a bracket 70 slidably mounted on a horizontally extending track 72. Track 72 is rigidly maintained in aligned position by a track supporting member 74, fastened to channels 52. A bellows 76 connects lens board 68 to an opening 78 (FIG. 5) in plate 56 providing a movable, light-tight connection therebetween.

A mirror 80 is mounted on lens board 68 at an angle of 45° for reflecting into the lens the image of the object to be photographed, as is well known in the art.

The object to be photographed is supported in a horizontal plane under the lens system by a vertically movable horizontal platform 82 slidably mounted on the lower rear plate 58. Platform 82 is supported by a pair of parallel, forwardly extending arms 84 which are vertically movable beneath the reversing mirror 80. This movement, in combination with the horizontal movement of the lens 66, varies the magnification of the image on the photographic paper, as is well known in the art.

Figure 5:
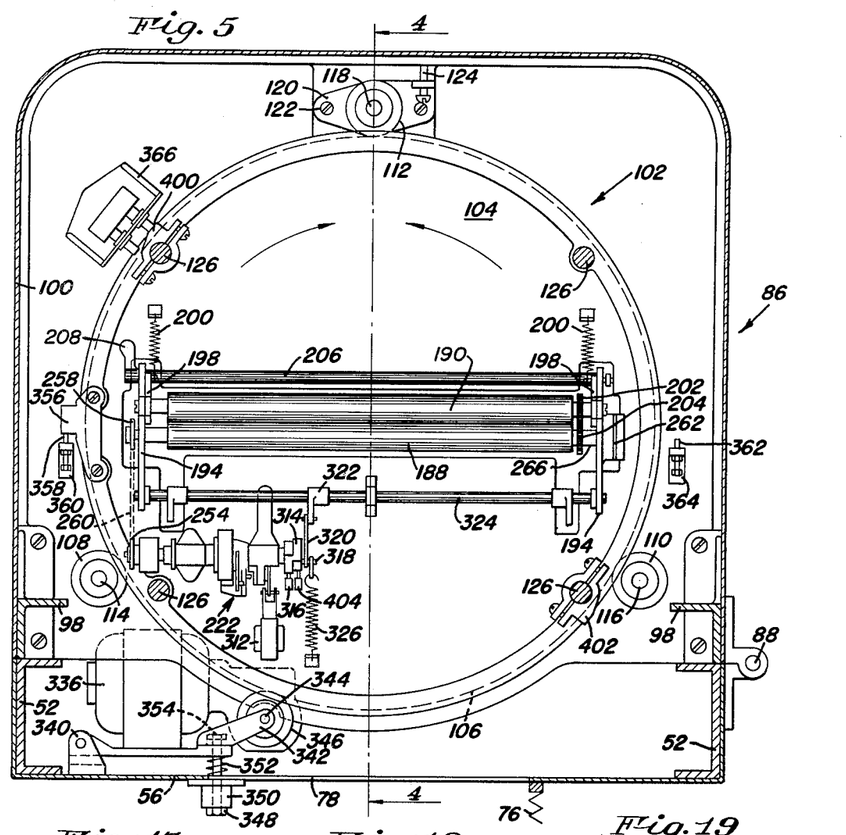
FIG. 5 is an enlarged, horizontal, cross sectional view of the paper magazine as shown in FIG. 4 with the top portions removed showing the turntable and its associated parts.

The photographic paper is stored and exposed in an enclosure 86, which is hinged to the frame 50 by means of hinges 88 (FIG. 5). Enclosure 86 comprises a base frame 92 (FIG. 3) having a large circular opening 94, a top frame 96, a front frame 98 (FIG. 5) and sheet metal panels 100, which are attached to frames 92, 96, and 98 to form a light tight enclosure for the photographic paper, when the enclosure 86 is locked in position against the frame 50.

The paper holding and exposing assembly 102 (FIGS. 3, 4 and 5) comprises a paper magazine, a mask, a winding and cutting means, and associated parts all mounted on a horizontal, circular turntable 104 rotatably mounted in enclosure 86. Turntable 104 is rotatably mounted in order to present both the back and front surface of the double coated photographic paper to the lens, so that both sides may be successively exposed, as described below. The edge of turntable 104 is formed with a peripheral V shaped groove 106 (FIG. 3) which is engaged by three equally spaced V shaped rollers 108, 110 and 112 (FIG. 5) which are rotatably mounted on short, vertical shafts 114, 116, and 118 on the base frame 92, in such a manner that the turntable 104 is free to rotate in a horizontal plane. Roller 112 (FIG. 5) is mounted on an adjustable bracket 120 which is pivotally mounted on bolt 122 and has an adjusting screw 124 whereby the roller may be moved inwardly into the groove 106 for taking up any play that may occur in the turntable 104.

Four upwardly extending rods 126 (FIGS. 3, 4 and 5) are mounted adjacent the edge of turntable 104. Rods 126 rigidly support a horizontal platform 128, having a transverse slot 130 and a vertical panel 132 upon which is mounted a reversible motor 134 having a speed reducer connected thereto (FIG. 4), whose function will hereinafter be disclosed.

Figure 3:
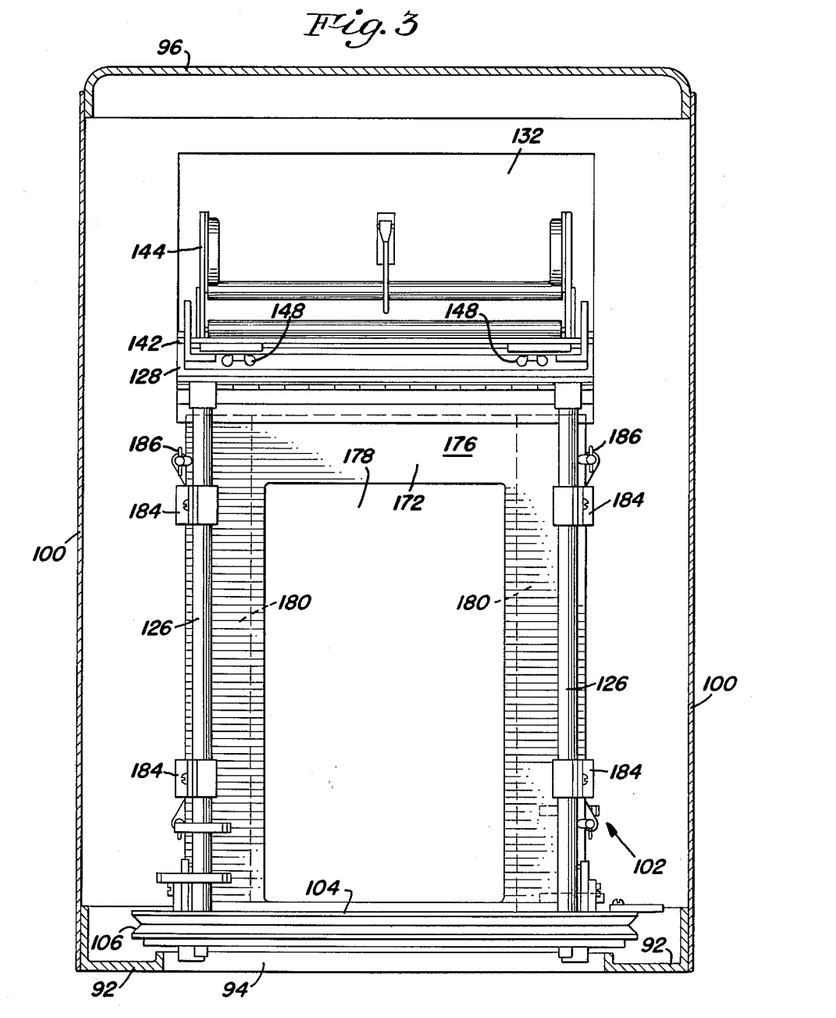
FIG. 3 is a vertical cross section taken substantially along line 3—3 in FIG. 4.

The paper magazine 136 (FIG. 4) comprises a spool holder pivotally mounted on platform 128. The spool holder comprises a holder frame 140 having a transverse track 142 upon which is mounted two spool holder trunnions 144 for holding the paper spool 146. Trunnions 144 are laterally adjustable on track 142, and may be spaced to hold rolls of paper of any desired width, and may be clamped in adjusted position by means of wing nuts 148 (FIG. 3). A cover 150 is slidably mounted on the platform 128 to shield the photographic paper from light when the enclosure 86 is opened for adjustment. A pair of paper guiding and tensioning rollers 152 and 154 are mounted, one above the other, on a vertically extending bracket 156 which is mounted adjacent the front edge of frame 140. Lower roller 154 is yieldably urged in its forwardmost position by a spring 158 in order to engage a third roller 160 mounted in a bracket 162 on the vertical panel 132 in line therewith. Rollers 152, 154 and 160 serve to guide the paper from the roll to the mask, as hereinafter described.

Figure 4:
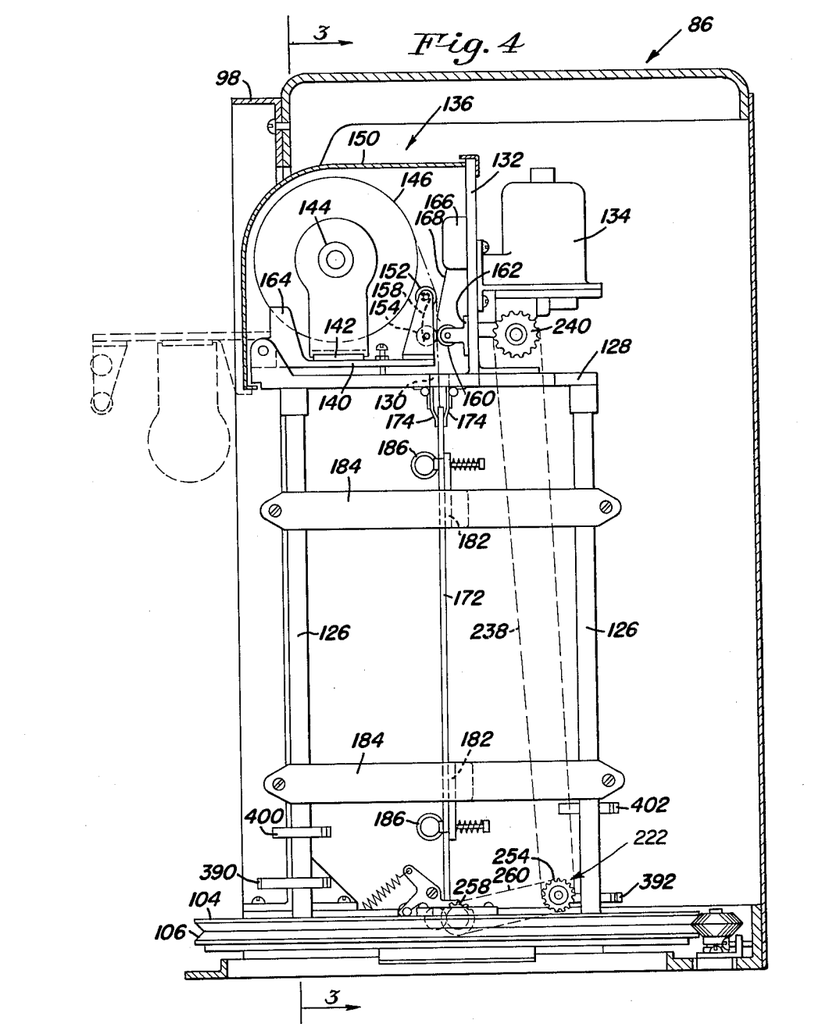
FIG. 4 is a vertical cross section taken substantially along line 4—4 in FIG. 5.

Spools of paper are inserted in magazine 136 as follows: Enclosure 86 is opened and turntable 104 is manually rotated to bring magazine 136 to a position adjacent to the opening in enclosure 86 as shown in FIG. 4. Cover 150 may then be easily removed through the frame 98 to expose the spool holding parts. The spool holder frame 140 is then pivoted upwardly and outwardly to the position shown in dotted lines in FIG. 4, so that trunnions 144 are easily accessible. Frame 140 is retained in convenient position for loading by a lug 164, which engages platform 128, as shown in the figure. The trunnions are set at the proper width to accommodate a spool of paper, and the spool is placed in position therebetween.

The leader on the photographic paper is unwound to a substantial length and the end threaded through slot 130 in the platform 128. The spool holder frame is then revolved back to normal position, with the paper lying over roller 152 and between the tensioning rollers 154 and 160. The angle at which the paper passes through slot 130 into the exposure zone is maintained constant by these rollers, regardless of whether the spool is full or partly empty, thereby assuring the precise position of the paper in the focal plane in order to produce a sharp image.

Figure 21:
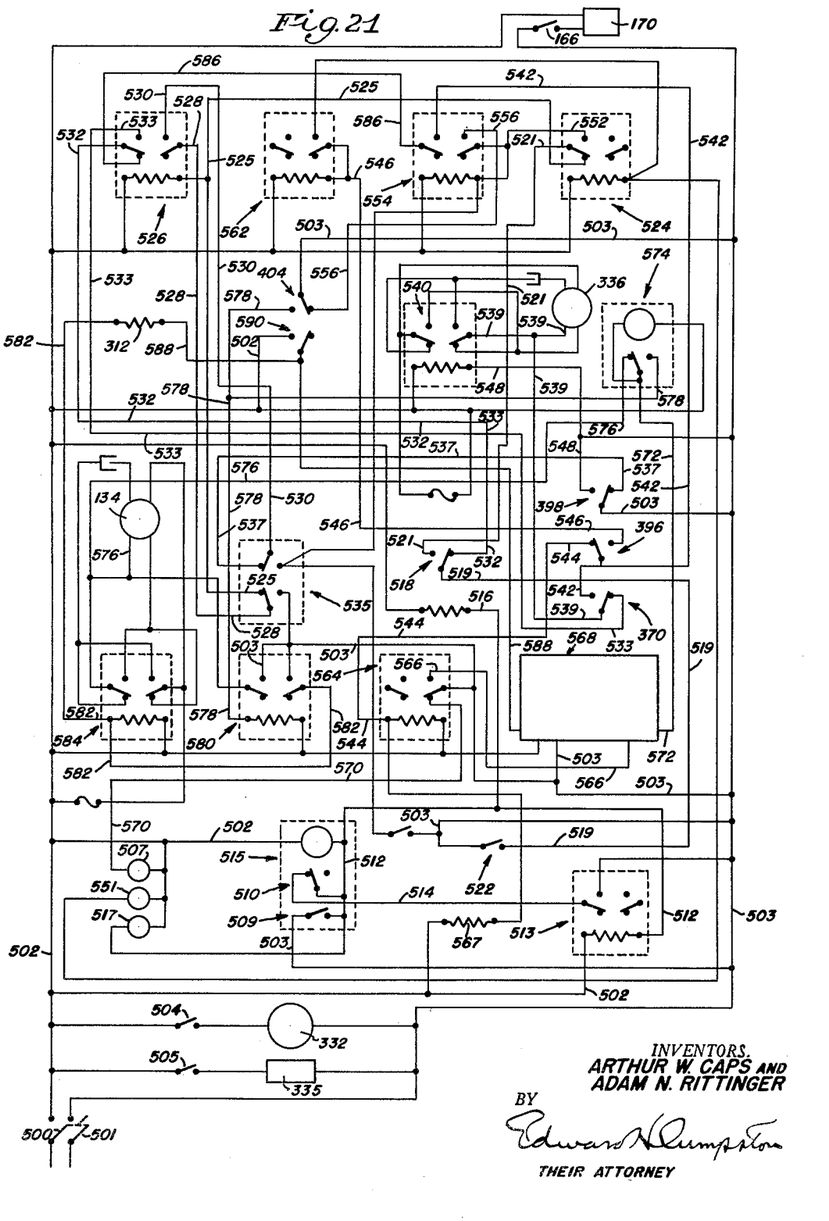
FIG. 21 is a schematic circuit diagram showing the electrical control circuit of the machine.

A microswitch 166 (FIG. 4) is mounted on panel 132. An outwardly extending arm 168 engages the paper leaving the roll, and will drop into the slot customarily left on each side of a splice, as described in the patent to Paul Landrock, Patent No. 2,109,373 issued February 22, 1938. Microswitch 166 is connected to a warning buzzer 170, as shown in FIG. 21, to warn the operator of the imperfection in the paper.

The paper passes through a slot 130 to a mask 172 positioned in the focal plane of the lens. A pair of flaps 174 are hingedly fastened to the bottom of platform 128 as shown in FIG. 4, to prevent light from exposing the paper between the platform and the top of the mask.

Figure 20:
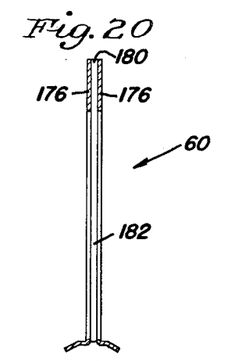
FIG. 20 is a vertical, cross sectional view of a mask removed from the machine.

The paper is held in flat position for exposure in the focal plane of the lens by mask 172. Mask 172 (FIGS. 3 and 20) comprises two metal sheets 176 having exposure openings 178 (FIG. 3) and separated by two strips 180 to provide a slot 182 (FIG. 20) for holding the photographic paper flat in the focal plane. The openings 178 are in alignment so that the images on opposite sides of the finished print are in registration. The size of openings 178 can be varied depending on the size of print desired, and strips 180 can be placed at varying distance apart to accommodate different widths of paper.

Mask 172 is supported in the exact center of the turntable 104 (FIG. 4) by brackets 182 mounted on horizontal bars 184 which are secured to the upright rods 126. Spring loaded locking devices 186 are provided for holding the mask in yielding contact with brackets 182 assuring proper positioning of the mask.

Figure 2:
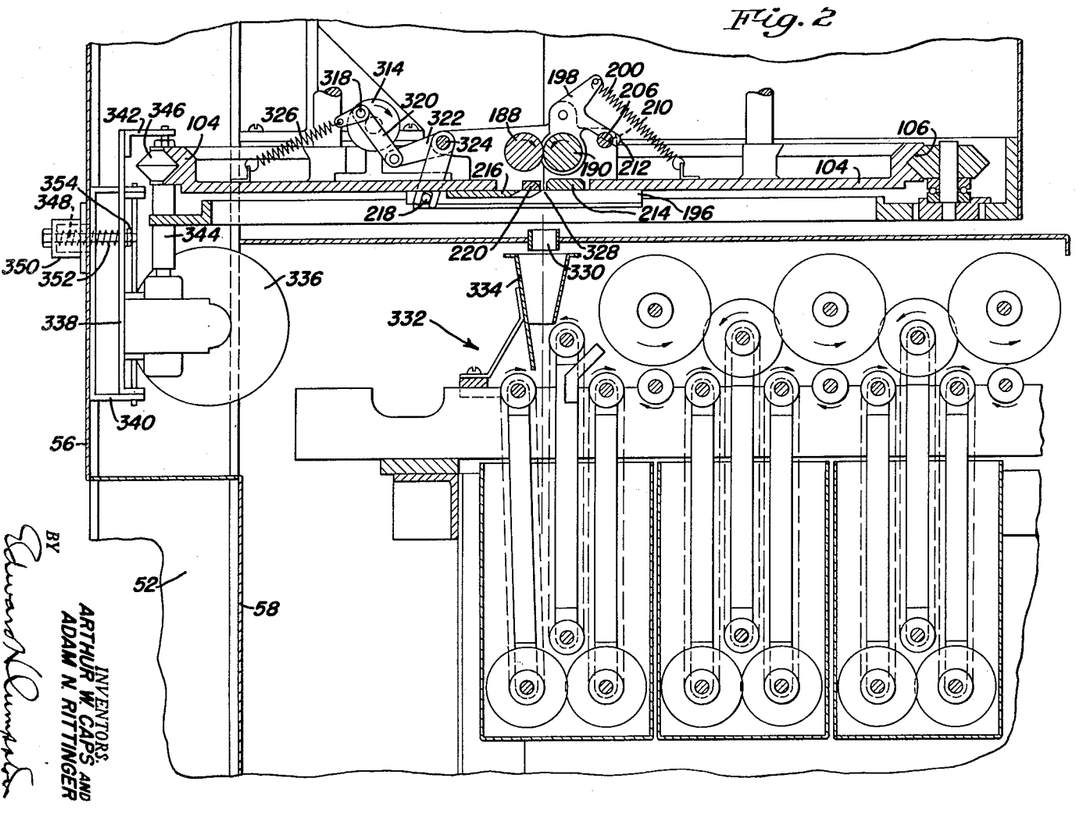
FIG. 2 is a fragmentary, vertical cross section taken substantially along the longitudinal center line of the copying camera, and showing the lower operating portions of the machine.

The paper is held tight in mask 172 by a pair of rollers 188 and 190 (FIGS. 2 and 5) which are mounted in an opening 192 (FIG. 13) in turntable 104 adjacent the bottom of the mask. Roller 188 is mounted in bearing members 194 (FIG. 5) on a pair of guide members 196, as shown in FIG. 2. Roller 190 is mounted on a pair of arms 198 which are, in turn, pivotally mounted in bearing members 194. Arms 198 are resiliently urged in a counter-clockwise direction (FIG. 2) by a pair of springs 200, thereby pressing roller 190 tightly against roller 188, to assure gripping contact with the paper passing therebetween.

A pair of connecting gears 202 and 204 (FIG. 5) are mounted at one end of each of winding and pressure rollers 188 and 190 so that both of the rollers rotate in synchronism to pull the paper therethrough when the rollers are brought together.

In order to facilitate the threading of the paper between rollers 188 and 190, a shaft 206 (FIG. 2) is pivotally mounted in bearing members 194 and has a handle 208 (FIG. 5) at one end. Shaft 206 is adjacent to arms 198 and has a flattened portion 210 which engages a finger 212 (FIG. 2) on the arms 198 in such a manner that when the handle 208 is moved to turn the shaft 206, arms 198 are turned to move the pressure roller 190 away from the winding roller 188 against the urging of springs 200, so that the paper can be threaded freely between the rollers. When the handle is released, springs 200 return roller 190 to its initial position engaging roller 188, to firmly grip and wind a sheet of paper.

Figure 6:
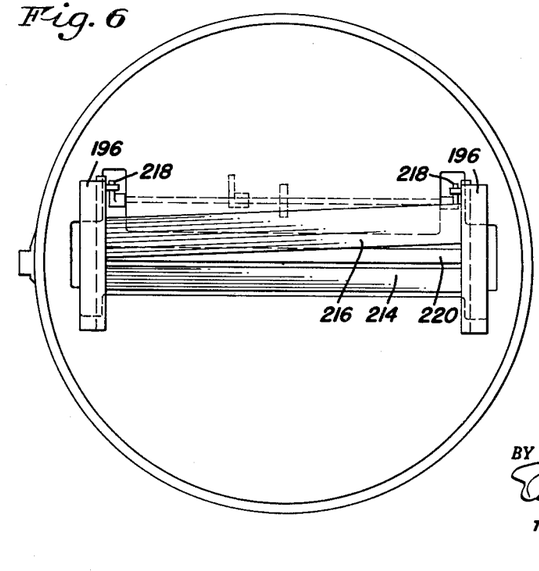
FIG. 6 is an enlarged bottom plan view of the turntable of FIG. 5.

Paper cutting means are mounted on the lower surface of turntable 104, directly under rollers 188 and 190 (FIGS. 2 and 6). The paper cutting means comprises a stationary knife member 214 and an opposed moving knife member 216 slidably mounted at an angle in stationary guide members 196 secured to the bottom of turntable 104 (FIGS. 2 and 6). Knife 216 is provided with a pair of inwardly extending pins 218 for connection with the actuating mechanism, as described below. A guide bar 220 is positioned parallel to and spaced from the stationary knife for holding the paper during the cutting operation and preventing the severed edge from being moved out of alignment by the sliding knife 216 on its return stroke.

The roller and knife mechanisms are driven by reversible electric motor 134 (FIG. 4). Motor 134 drives chain 238 to drive a transmission unit 222 (FIGS. 4 and 5 and 7–12). When the latter is driven in its normal or forwardly direction, it actuates rollers 188 and 190 through chain 260 (FIG. 5), winding off paper until a synchronous motor timer (574 in FIG. 21), which forms part of the electrical control circuit hereinafter described, stops the motor and causes the same to reverse. Timer 574 is calibrated to wind off a sheet of paper of the length required for one print. When motor 134 reverses, transmission unit 222 actuates the knife mechanism, as described below.

Transmission unit 222 (FIGS. 7 to 12, inclusive) comprises three axially aligned shafts 224, 226, and 228 mounted in bearing members 230 and 232 which are secured to turntable 104 in parallel relation to the winding rollers. Shaft 224 is connected to shaft 228 by means of a unidirectional, single revolution clutch, shown generally at 234 (FIGS. 7 and 8) and is integral with shaft 226. Shaft 224 is driven by a sprocket 236 which is driven by motor 134 through chain 238.

Figures 7, 8, 9:
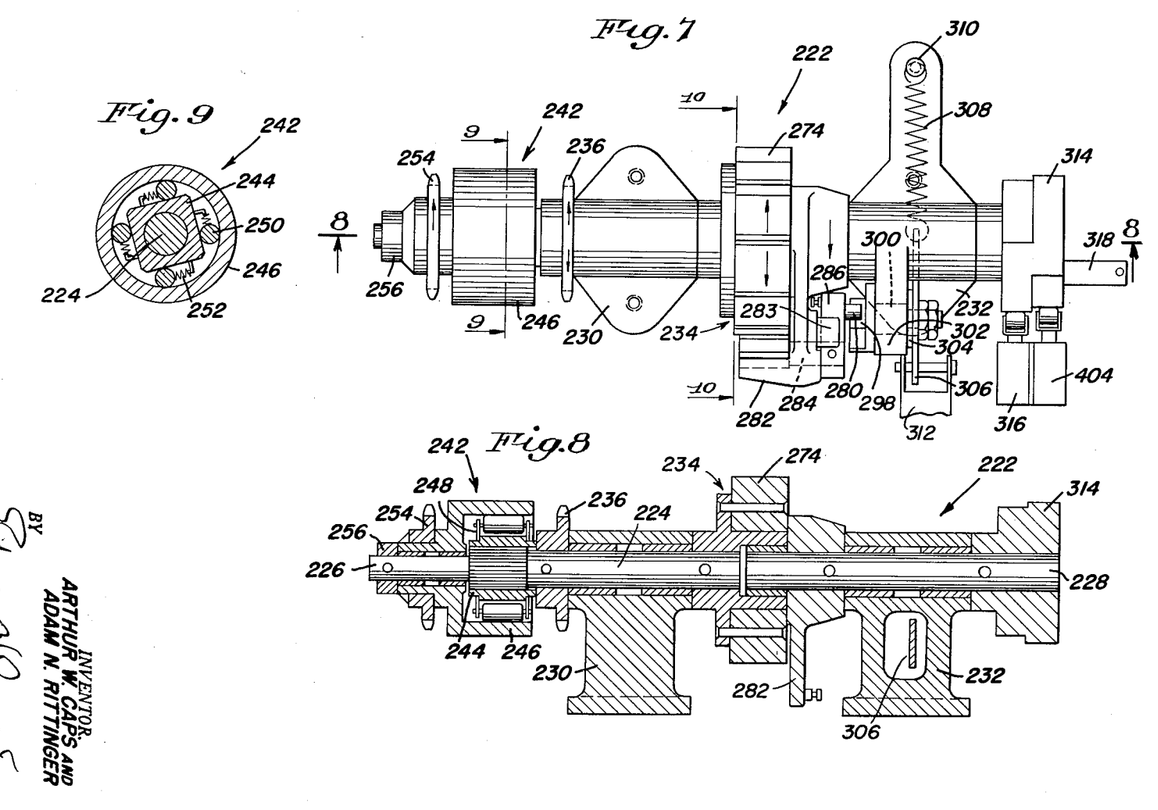
FIG. 7 is an enlarged top plan view of the transmission mechanism removed from the turntable.
FIG. 8 is a side elevational, cross section taken substantially along line 8—8 of FIG. 7.
FIG. 9 is a cross section substantially along line 9—9 of FIG. 7.

Unidirectional clutch 242, shown in detail in FIG. 9, is mounted on shaft 224 adjacent sprocket 236. Clutch 242 comprises a drive member 244 of square cross section mounted on shaft 224, a driven member or housing 246 mounted on shaft 226, and a cage 248 (FIG. 8) mounted therebetween. Cage 248 carries a plurality of rollers 250 (FIG. 9) which are yieldably forced in one direction by springs 252. A sprocket wheel 254 (FIG. 8) is rigidly mounted on the outer end of housing 246 and the entire assembly is free to turn on shaft 226 in one direction and is held in lateral position by collar 256 pinned to shaft 226.

When shaft 224 is turned in counterclockwise direction as viewed in FIG. 9, rollers 250 are wedged between drive member 244 and housing 246, and turn the housing, along with sprocket wheel 254, in the same direction, as indicated by the arrow in FIG. 7. However, when shaft 224 is turned in the opposite direction, rollers 250 will slip and permit shaft 224 to turn freely without affecting housing 246 or sprocket wheel 254, so that the latter remains stationary.

Sprocket wheel 254 drives a second sprocket wheel 258 on the winding roller 188 (FIGS. 4 and 5) through a sprocket chain 260, so that when the shaft 224 turns in one direction, the roller clutch will drive the winding rollers to wind a sheet of paper. However, when the shaft 224 turns in the opposite direction the winding rollers are not affected, and remain stationary.

Figure 19:
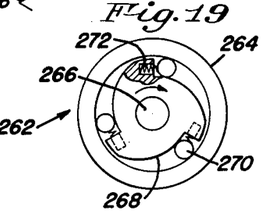
FIG. 19 is an enlarged end elevation partly in section, showing a roller clutch of the winding mechanism removed from the machine.

The paper is wound by rollers 188 and 190 against the yielding resistance of spring loaded rollers 154 and 160, as described above. This tension is desirable in that it serves to hold the paper flat in the focal plane of the lens and resists the natural tendency of the paper to curl and buckle. However, it has been found that drives embodying a plurality of sprocket chains and clutches tend to have a certain amount of lost motion or backlash which would allow rollers 188 and 190 to turn slightly in a reverse direction. This would relieve the tension on the paper, and result in the curling and buckling described above. In order to prevent this, a roller clutch 262 (FIGS. 5 and 19) is mounted on one side of one of the bearing members 194. Clutch 262 comprises stationary housing 264 (FIG. 19) into which projects an extension 266 of the winding roller 188. A star wheel 268 is secured to the extension 266 and engages rollers 270. The latter are yieldably held in position by springs 272 in such a manner that when the winding roller is turned to feed paper, star wheel 268 turns in the direction of the arrow in FIG. 19 and rollers 270 will slip on the inner face of the housing 264. However, when the winding rollers stop, rollers 270 are wedged between housing 264 and the star wheel, and prevent any reverse motion or backlash of the winding rollers.

The cutting knife is actuated when motor 134 runs in reverse direction. Power is transmitted to shaft 224 by chain 238, and thence to shaft 228 through unidirectional single revolution clutch 234, mentioned above. Clutch 234 comprises a toothed wheel 274 (FIGS. 7, 8 and 10) fixed to shaft 224, and an arm 282 pinned to shaft 228. A dog 278 (FIG. 10) is fixed on a pin 284 rotatable in the outer end of arm 282 in position to engage the teeth of wheel 274. The opposite end of pin 284 carries an arm 286 (FIG. 12) fixed thereon and having a spring stud 290 which carries a spring 292 which extends to a spring stud 294 on an extension 296 of arm 282. The force exerted by spring 292 resiliently urges arm 286 downwardly, tending to rotate pin 284 in a clockwise direction as viewed in FIG. 12, thereby urging dog 278 inwardly, towards toothed wheel 274.

Figure 10:
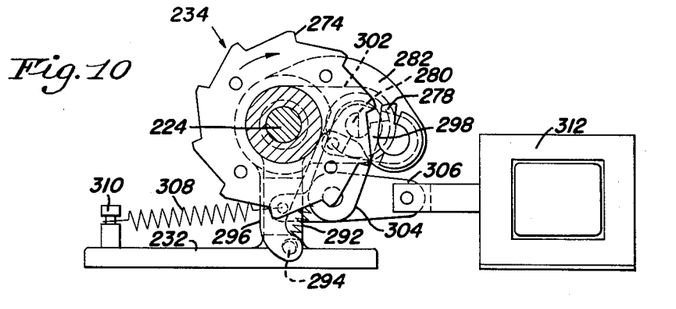
FIG. 10 is a cross section substantially along line 10—10 of FIG. 7.
Figure 11:
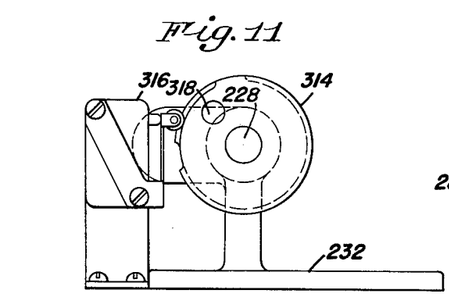
FIG. 11 is an end elevation of the transmission means of FIG. 7.
Figure 12:
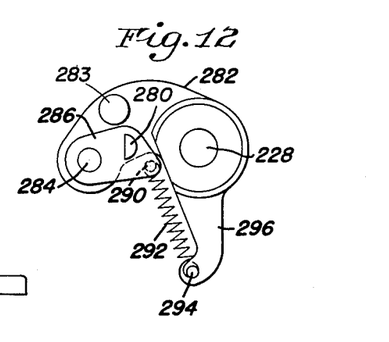
FIG. 12 is an enlarged view of a pawl assembly removed from the transmission means.

This movement of arm 286, pin 284 and dog 278 is prevented by a half-moon shaped pawl 280 mounted on and extending laterally from arm 286. Pawl 280 engages a laterally extending arcuate shaped cam 298 (FIGS. 7 and 10). Cam 298 is mounted on a pin 300 rotating in a laterally extending stationary arm 302 (FIG. 7) which forms an integral part of bearing member 232. A lever 304 is fixed to the opposite end of pin 300. The outer end of lever 304 is pivotally attached to a link 306 which is yieldably urged inwardly by a spring 308 attached to a spring stud 310 on bearing member 232. The opposite end of link 306 is connected to the armature of a solenoid 312 (FIG. 10).

Referring to FIG. 10, it should be noted that half moon shaped pawl 280 normally rests on cam 298 thereby holding dog 278 in inoperative position away from toothed wheel 274, so that the wheel 274 is free to turn in either direction. However, when solenoid 312 is actuated, lever 304 is turned counterclockwise around pin 300 (FIG. 7), moving cam 298 away from pawl 280, permitting the latter to drop off the lower edge thereof. This allows the arm 286 to move under the influence of spring 292, turning pin 284 to bring dog 278 into engagement with toothed wheel 274.

When dog 278 engages wheel 274 as described above, the dog, arm 282 and shaft 228 rotate as a unit, carrying arm 286 and dog 278 around with them. As shaft 228 rotates, it turns cam 314 mounted on the end thereof. A microswitch 316 is mounted adjacent cam 314 having its operative part in engagement therewith, so that the rotation of the cam actuates the switch. Cam 314 is so cut that it actuates the microswitch 316 after revolving a short distance. Microswitch 316 breaks the circuit to solenoid 312, deenergizing the same, allowing cam 298 to return to its initial position under the urging of spring 308.

When arm 282 and its associated parts have made one complete revolution, pawl 280 strikes cam 298 (which has returned to its original position), thereby disengaging dog 278 from wheel 274, breaking the connection between this wheel and arm 282. Arm 282 and shaft 228 then come to a stop. Thus, arm 282, shaft 228 and cam 314 make a single, complete revolution every time solenoid 312 is energized. Arm 282 is finally arrested by engagement of its lug 283 with arm 286.

A second microswitch 404 is mounted adjacent a second cam surface of cam 314 (FIG. 7). Switch 404 is part of the electrical control circuit, hereinafter described, and serves to break the circuit to motor 134 after shaft 228 makes its single revolution, as described above.

An outwardly extending eccentric pin 318 is rigidly mounted on the free face of cam 314 (FIGS. 5, 7 and 10). Pin 318 is connected through link 320 (FIG. 5) to a lever 322 on the knife operating shaft 324 (FIGS. 2 and 5). When the one revolution clutch 234 is actuated to make a single revolution, pin 318 moves link 320 and lever 322 forwardly and backwardly, rocking shaft 324. This rocking action of shaft 324 moves the knife 216 inwardly relative to the stationary knife 214, to cut off a sheet of paper, and returns it to its original position. A spring 326, connected to the pin 318 and fastened to the turntable 104, resiliently opposed the rotation of cam 314, shaft 228 and arm 282, thereby resiliently forcing the half-moon shaped pawl 280 downwardly against the cam 298 preventing rotation of arm 282 when toothed wheel 274 is turned in the opposite direction.

The operation of the winding and cutting mechanism just described takes place when the reversible motor 134 is actuated by the electric control circuit in such a manner that it makes a predetermined number of revolutions in a counter-clockwise direction, as viewed in FIG. 4, reverses, and makes a predetermined number of revolutions in the opposite direction. When running in a counter-clockwise direction the motor drives the sprocket 236 through chain 238, causing clutch 242 to engage and drive sprocket 254. The latter drives sprocket 258 through chain 260, causing rollers 188 and 190 to operate to wind off a sheet of paper of predetermined length. After the requisite amount of paper has been wound off, motor 134 is reversed and solenoid 312 is momentarily energized by the electric control circuit. Shaft 224 is now rotating in the opposite direction, so clutch 242 disengages, breaking the power train to the winding rollers, so these remain stationary. However, since solenoid 312 has tripped the single revolution clutch, the latter engages and causes cam 314 to make one revolution, actuating the knife mechanism to cut off the sheet of paper extending below the rollers.

As the sheet passes downwardly from the enclosure 86, it passes through a slot 328 (FIG. 2) and a light guard 330 on the top of the processing unit 332, and then through a guiding chute 334 into the processing tanks for developing and processing, in the manner described in the copending application of Ernest P. Taubes, Serial No. 408,119, filed February 4, 1954. Processing unit 328 delivers the processing print to a drier 335. Drier 335 may be of any of the known types of belt or drum driers, which operate continuously, and which deliver the dried print in condition for immediate use.

Turntable 104 is rotated by a second reversible motor 336 (FIGS. 2 and 5). Motor 336 is mounted on a frame 338 which is pivotally mounted in a bracket 340 secured to the front plate 56 of the stand 50. Frame 338 carries bracket 342 which rotatably supports an upwardly extending shaft 344. A V-shaped friction drive wheel 346 is rigidly mounted at the top of shaft 344 and engages in the V-groove 106 in the periphery of turntable 104. Bracket 338 is provided with an adjusting screw 348 which extends through the bracket 338 and front plate 56 and threadedly engages a sleeve 350. A spring 352 is provided to yieldably urge bracket 338 towards turntable 104, assuring tight, frictional contact of wheel 346 therewith. A nut 354 adjacent the inner end of screw 348 limits the inward movement of bracket 338 so that when the enclosure 86 is opened, the motor and friction wheel move only slightly out of position, retaining these parts in proper position to engage turntable 104 when enclosure 86 is closed.

In order to limit the movement of turntable 104 a lug 356 (FIG. 5) is positioned thereon in position to contact an adjusting screw 358 in a bracket 360 mounted on the base frame 92. A second adjustng screw 362 is mounted in a bracket 364 mounted on frame 92 in a position diametrically opposite to that of bracket 360. Brackets 360 and 364 are positioned to stop the rotation of turntable 104 when mask 172 is in position to hold the photographic paper in the focal plane of the lens. Adjusting screws 358 and 362 are provided to permit accurate adjustment of the two positions of turntable 104.

Figure 14:
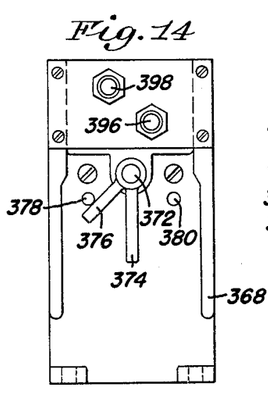
FIG. 14 is an enlarged front elevation of the switch mechanism shown in FIG. 13.
Figures 15, 16:
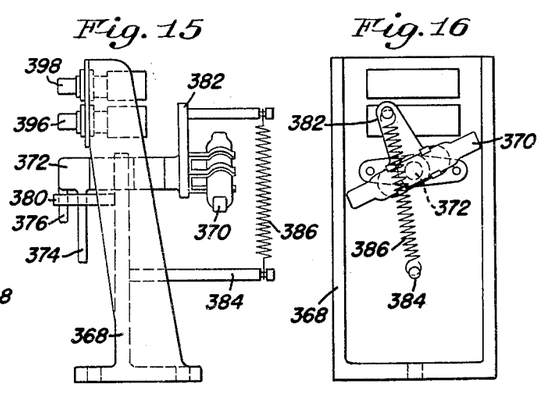
FIG. 15 is a side elevation of the switch mechanism of FIG. 14.
FIG. 16 is a rear elevation of the switch mechanism of FIG. 14.
Figures 17, 18:
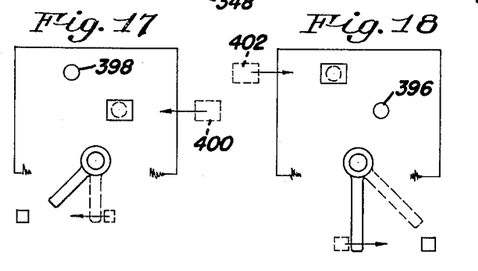
FIG. 17 is a schematic view of the switch mechanism of FIG. 14, showing the switch parts in position at the beginning of a cycle.
FIG. 18 is a schematic view similar to FIG. 17 showing the parts in position after the turntable has revolved 180°.

A switch assembly 366 (FIGS. 13–16) is mounted on a bracket 368 adjacent to turntable 104. Switch assembly 366 comprises a single-throw, double-pole mercury switch 370 mounted on a shaft 372 pivotally mounted in bracket 368. A long arm 374 and a short arm 376 are mounted at divergent angles on the inward end of shaft 372, as shown in FIG. 14. A pair of spaced, inwardly extendng pns 378 and 380 are mounted on bracket 368 to limit the movement of arms 374 and 376 and the rotation of shaft 372. Also mounted on shaft 372 is an upwardly extending arm 382 (FIG. 15) connected to a second arm 384 on bracket 368 by a tension spring 386 which imparts an over-center toggle action to switch 370, so that when shaft 372 is rotated past dead center in either direction, spring 386 will cause the switch to move quickly to the limit of travel in that direction, as determined by pins 378 and 380.

Figure 13:
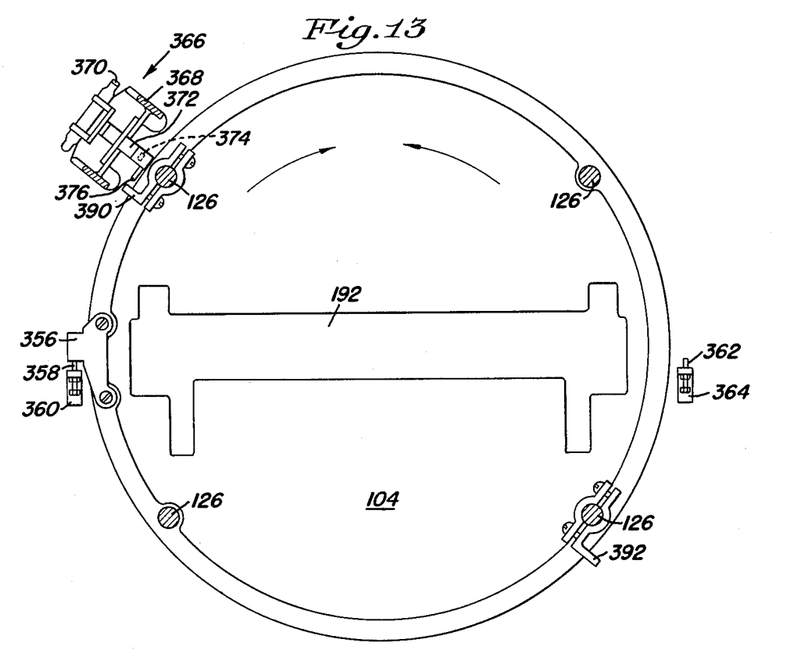
FIG. 13 is a top plan view of the turntable of FIG. 5 with the upper parts removed therefrom.

A pair of outwardly extending lugs 390 and 392 are clamped to diametrically opposite rods 126, as shown in FIGS. 4 and 13. As shown in FIG. 4, lug 390 is disposed slightly higher than lug 392 and, as shown in FIG. 13, lug 390 is shorter than lug 392. These lugs are positioned so that they will contact the long and short arms 374 and 376 respectively when they move past switch assembly 366, moving these to rotate shaft 372 to reverse the position of mercury switch 370.

When motor 336 is started at the proper time by the electrical control circuit, as hereinafter described, it rotates turntable 104 by means of friction wheel 346, as described above. Assuming that the turntable rotates in a clockwise direction as viewed in FIG. 13, lug 390 will move past arms 376 and 374. However, lug 390 will not contact either of these arms; it misses arm 376 because the latter is in its highest position as shown in FIG. 14, and the lug passes therebeneath, and it misses arm 374 because this arm is placed further from turntable 104, and lug 390 is not long enough to reach it. Thus, the position of mercury switch 370 is not affected by lug 390. However, further rotation of turntable 104 moves lug 392 around to engage switch assembly 366. Since lug 392 is lower than lug 390, it also misses arm 376, but being longer, it engages arm 374, moving it to the right as viewed in FIG. 14, and rotating shaft 372 in a counter-clockwise direction. This rotation of shaft 372 moves arm 382 upwardly against the tension of spring 386 until it passes the vertical position, when the tension of the spring quickly completes the rotation of shaft. This movement reverses the position of mercury switch 370, which stops motor 336, allowing turntable 104 to coast until it is stopped by the contact of lug 356 against screw 362.

A pair of micro-switches 396 and 398 are mounted adjacent the top of switch 366 in line with cams 400 and 402 (FIGS. 4 and 5) mounted on the upright rods 126 on opposite sides of the turntable 104, in juxtaposition to lugs 390 and 392. Immediately following the stopping of the motor and as the turntable coasts to a stop against adjusting screw 358, cam 400 engages micro-switch 396, depressing it as shown in FIG. 5, which actuates the electric control circuit to reverse the motor 336.

After the exposure has been made on the opposite side of the paper, motor 336, which has been reversed as described above, is started by the control circuit and the turntable 104 is revolved in the opposite direction. As it approaches the end of its travel, lug 392 actuates the arm 374 again reversing the position of mercury switch 370 and stopping motor 134. As turntable 104 coasts to a stop against adjusting screw 362, cam 402 operates microswitch 398, which actuates the control circuit to start the motor 134 on the paper exposing assembly 102 to wind and cut off a sheet of paper as described above.

During the cutting operation, cam 314 (FIGS. 5, 7 and 11) makes a single revolution, as described above. At the end of this revolution, cam 314 actuates a microswitch 404 (FIGS. 5 and 7) thereby stopping the machine. The camera is now in position to repeat its cycle when actuated by the operator.

The electrical control circuit, shown in FIG. 21, comprises a series of switches, relays, and other components, connected to a source of power as shown in the diagram. Its construction and the functions of the component parts are best described by describing a cycle of operation as follows: Main switches 500 and 501 are closed, supplying power to main lines 502 and 503. Switches 504 and 505 are closed to start the processor and drier. These mechanisms operate continuously during the period when the camera is in use, to process and dry the photographic prints as they are exposed by the camera.

The camera is now ready for the first exposure. The "ready" pilot light 507 will be on, indicating this to the operator. When the operator depresses exposure button 509 microswitch 510 is actuated closing the circuit from wire 503 to wire 512 and energizing relay 513. Even though the push button contact is only momentary, relay 513 maintains the circuit from wire 503 to wire 514 back to wire 512 so that timer 515, shutter solenoid 516, shutter pilot light 517 and relay 513 are energized until preselected exposure time has expired.

When the shutter solenoid 516 closes, it mechanically actuates microswitch 518 so that current is carried from wire 519 to wire 521. Wire 519 receives its current through a multiple exposure switch 522 from wire 503, and therefore line 503 is connected through wire 519 to wire 521, and through wire 521 to the closed contacts of a relay 524 through wire 525 to relay 526 to energize the latter.

When relay 526 is energized, it closes contacts on both sides of its armature. On one side it closes contacts between wires 528 and 530, and on the other side between wires 532 and 533. Both wires 528 and 530 are connected to a double-pole, double-throw switch 535. This switch is provided to allow operation of the camera to expose photographic paper sensitized on one or both sides. When it is desired to expose both sides of the paper, the turntable must be rotated between successive exposures. This will hereinafter be referred to as "Duplex" operation. Where the paper is sensitized on one side only, it is not necessary to revolve turntable 35 between successive exposures. This will be hereinafter referred to as "Simplex" operation. Simplex-Duplex switch 535 may be set to by-pass the table turning function of the control circuit.

Assuming that switch 535 is set for "Duplex" operation, wire 530 connects through switch 535, to wire 537 which in turn carries current from microswitch 398 on turntable 104 and which is connected to line 503. The current flows from line 503 through microswitch 398, through wire 537, through switch 535 and to wire 530, thence through the relay 526 to wire 528, through the switch 535 again, and through wire 525 to the relay coil of relay 526. This current will maintain relay 526 in energized condition, even though shutter solenoid 516 is de-energized and breaks the connection between wires 519 and 521. Once timer 515 has completed its pre-set cycle, it will break the connection between wires 514 and 512, thereby de-energizing relay 513 and disconnecting the current from shutter pilot light 517.

Once shutter solenoid 516 is de-energized, it releases microswitch 518 which re-establishes connections between wires 519 and 532. This permits current to flow through wire 519 into wire 532, through relay 526 to wire 533, and thence to the mercury switch 370 described above. The current passing through switch 370 travels along wire 539, through relay 540 to turntable motor 336. This current actuates motor 336 to rotate turntable 104 as described above. As soon as turntable 104 rotates cam 400 mechanically releases microswitch 396 so that the connection from switch 370 through wire 542 is switched from wire 544 to wire 546. At the end of the rotation of turntable 104, cam 402 and lug 392 actuate microswitch 398 and mercury switch 370, respectively, as explained above. Microswitch 398 switches the connection of line 503 from line 537 to line 548. The disconnection of line 537 from the source of current from line 503, de-energizes relay 526. The relay then breaks the connection between wires 532 and 533, cutting off the current actuating turntable motor 336.

The actuation of mercury switch 370 breaks the connection between wires 533 and 539, and, at the same time, establishes a connection betwen wires 539 and 542. Turntable 104 is now in reversed position, presenting the back of the photographic paper to the lens, and the following connections have been established: Microswitch 398 has connected wires 503 and 548, energizing relay 540 and lighting pilot light 551 on the control panel, which indicates that the back surface of the paper is ready for exposure. Mercury switch 370 has established a connection between wires 539 and 532. Microswitch 396 has connected wires 542 and 546. The energizing of relay 524 has established contact betwen wires 521 and 552, which is connected to the center terminal of relay 554. The energizing of relay 540 has reversed the field connections of turntable motor 336 so that when the latter is next energized, it returns the turntable 104 to its initial position.

The second exposure is made by depressing exposure button 509, starting the following cycle. The sequence of operations is the same as described above, wherein the momentary contact of microswitch 510 connects wires 503 and 512 thus energizing relay 513. Shutter solenoid 516 and shutter pilot light 517 are energized, as before. Even when the button 509 is released, current will be maintained through wires 503 and 514 and relay 513 until timer 515 has completed its pre-set cycle. When shutter solenoid 516 is energized, it will trip microswitch 518 connecting wires 519 and 521. This energizes relay 554 through the connection already established in relay 524. Relay 554 connects wires 552 and 556 on one side to hold relay 554 closed. Wire 556 is connected to power line 503 through microswitch 404 which is located on turntable 104, described above in connection with the winding mechanism.

When shutter solenoid 516 is energized, it moves microswitch 518 to connect wires 519 and 532 sending current through wire 532 through relays 526 and 554 to wire 542. The latter is connected to wire 539 through mercury switch 370 and this energizes turntable motor 336 to rotate turntable 104 to its normal starting position. This also energizes relay 562 through wire 542 and wire 546 on microswitch 396.

As soon as turntable 104 beings to rotate, cam 402 disengages microswitch 398 breaking the connection between wires 503 and 548 and re-establishing contact between wires 503 and 537. Relay 562 establishes a connection between wires 546 and 548, thereby maintaining relays 524 and 540 in energized condition, despite the fact that connections between lines 503 and 548 on microswitch 398 have been broken.

When the turntable completes its rotation, it returns mercury switch 370 back to its original position, connecting wires 539 and 533 and breaking the connection between 539 and 542, thus stopping the turntable motor. It also actuates microswitch 396, stopping the flow of current between line 542 and line 546 and establishing contact between wires 542 and 544. This allows current to flow, through wire 544 to relay 564, keeping it energized, and at the same time energizes the counter solenoid 567 to advance it one digit. The disconnecting of wire 546 de-energizes relay 562 and this in turn, disconnects the current from relay 524, relay 540 and the pilot light 551.

When relay 564 is energized as described above, it closes contacts between power line 503 and wire 566 sending power to fixed interval timer 568 at the same time disconnecting power line 503 and 570 which carried current to pilot light 507. This extinguishes pilot light 507, indicating that the paper in exposure zone is exposed.

A delay timer 568 is provided in the winder circuit to prevent the latter from operating to send a print to processor 332 before the previously exposed print has cleared entrance chute 334. If delay timer 568 has completed its cycle from the previous exposure and is in closed position, the current is able to flow from wire 566 to wire 572 into a paper winding timer 574, preferably a synchronous motor as shown in FIG. 21, and thereby actuate that timer so that its timing cycle will begin. As soon as this timer receives current, it also carries the current through the wire 576 back to the paper winding and shearing motor 134, to start the same in order to wind paper into the processor. Timer 574 is preferably an adjustable "seconds timer" which permits the winding mechanism to run for a predetermined number of seconds, and therefore wind a predetermined length of paper. This timer can be set to various numbers of seconds and therefore permits various lengths of the paper to be wound off.

Since winding rollers 188 and 190 revolve at a constant speed as determined by speed of motor 134 and its associated driving means, the length of paper to be wound off may be controlled by varying the setting of timer 574. In a machine of this type wherein documents of various sizes are to be photographed at various magnifications, it is essential to be able to wind and cut off sheets of various lengths. Timer 574 provides automatic means for accomplishing this.

When the preset time for which timer 574 has been set has elapsed, the latter breaks the connection between wire 572 and wire 576 and, at the same time, establishes contact between wires 572 and 578. This energizes relay 580, connecting power wire 503 and wire 582 thereby energizing relay 584. Relay 584 reverses the connection of winding field coils of the motor 134 so that it reverses its rotation, and, at the same time, sends current to knife actuating solenoid 312 on the turntable 104, releasing the pawl to engage the single revolution clutch. This actuates the knife mechanism, as described above, cutting off the photographic paper and allowing it to drop into the processor.

During the revolution of the single revolution clutch, cam 314 first actuates microswitch 404 breaking the connection between power line 503 and 556, and connecting wires 503 and 578 thereby stopping the current which was flowing from power line 503 through wire 556, through the contacts of relay 554 and into the coil thereof keeping it energized. This de-energizes relay 554 and at the same time allowing current to flow directly through wire 578 to the coil of relay 580. This maintains relay 580 and 584 in energizsed condition until the single revolution of the cut off mechanism has been completed, as described below.

When relay 554 is de-energized, it breaks the connections between wires 586 and 542 and between wires 542 and 544 in microswitch 396, de-energizing relay 564 and counter solenoid 566. Secondly, the cam 314 breaks the connection between wires 502 and 588 on microswitch 590, and knife actuating solenoid 312, de-energizing the same, allowing the pawl of the single revolution clutch to fall into place as described above. When the revolution of the clutch has been completed, microswitch 404, is returned to its normal position, thereby breaking the connection between wires 503 and 578, and re-establishing the connections between wires 503 and 556. This disconnecting of wire 578 de-energizes relay 580 which in turn de-energizes relay 584 which stops the paper winding motor 134. This completes the cycle of the camera, and every relay is de-energized and every switch is returned to its normal position.

It will thus be seen that the invention accomplishes its objects and while it has been hereindisclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. An automatic copying camera comprising means for holding a web of photographically sensitized sheet material, means for exposing said material, means for feeding said material from said holding means to said exposing means, means for cutting off exposed material fed by said feeding means, a first shaft rotatable alternately in opposite directions, clutch means operating in one of said directions of rotation only for connecting said shaft with said feeding means for driving said feeding means in one direction only, a second shaft rotatable in the other of said directions only in coaxial alignment with said first shaft, means for connecting said second shaft with said cutting-off means to sever said exposed material, a reversible, electrical motor connected to said first shaft for rotating the same in said opposite directions, clutch means for connecting said shafts for rotating said second shaft in said other direction through one revolution only, and means for reversing the direction of rotation of said motor to feed a predetermined length of said material and thereafter rotate said second shaft to cut off said length of exposed material.

2. An automatic copying camera comprising means for holding a web of photographically sensitized sheet material, means for exposing said material, means for feeding said material from said holding means to said exposing means, means for cutting off exposed material fed by said feeding means, a first shaft rotatable alternately in opposite directions, clutch means operating in one of said directions of rotation only for connecting said shaft with said feeding means for driving said feeding means in one direction only, a second shaft rotatable in the other of said directions only in coaxial alignment with said first shaft, means for connecting said second shaft with said cutting-off means to sever said exposed material, a reversible, electrical motor connected to said first shaft for rotating the same in said opposite directions, clutch means for connecting said shafts for rotating said second shaft in said other direction through one revolution only, a timer for controlling the length of material fed by said feeding means, and means controlled by said timer for reversing the direction of rotation of said motor to feed a predetermined length of said material and thereafter rotate said second shaft to cut off said length of exposed material.

3. An automatic camera comprising means for holding a web of photographically sensitized sheet material, means for exposing said material, means for feeding said material from said holding means to said exposing means, means for cutting off exposed material fed by said feeding means, electric circuit means, a reversible electric motor in said circuit means, one-way friction roller clutch means for connecting said motor to said feeding means, one-way rotary clutch means for connecting said motor to said severing means and provided with means for limiting the operation of said rotary clutch means to a single revolution, and means in said circuit means for effecting and timing the operation of said motor in one direction to operate said feeding means for a predetermined time and for thereafter effecting the operation of said motor in the opposite direction for operating said severing means to sever said exposed material.

4. An automatic copying camera comprising means for holding a web of photographically sensitized sheet material, means for exposing said material, means for feeding said material from said holding means to said exposing means, means for cutting off exposed material fed by said feeding means, electric circuit means, a reversible electric motor in said circuit means, one-way driving means for connecting said motor to said feeding means, one-way single revolution driving means for connecting said motor to said severing means and means comprising a synchronous electrical motor in said circuit provided with switch means for operating said motor to actuate said feeding means in one direction for a predetermined period and for thereafter actuating said motor in the opposite direction for operating said severing means to sever said exposed material.

5. An automatic copying camera comprising means for holding a web of photographically sensitized sheet material, means for exposing said material, means for feeding said material from said holding means to said exposing means, means for cutting off exposed material fed by said feeding means, electric circuit means, an electric motor in said circuit means, one-way driving means for connecting said motor to said feeding means, one-way single revolution driving means for connecting said motor to said severing means and provided with switch means for terminating operation of said motor after operation of said severing means, and means in said circuit comprising a timing device for effecting operation of said motor in one direction for a predetermined period to operate said feeding means and for thereafter effecting operation of said motor in the opposite direction for operating said severing means to sever said exposed material.

6. An automatic copying camera comprising means for holding a web of photographically sensitized sheet material, shutter means for exposing said material, means for feeding said material from said holding means to said exposing means, means for cutting off exposed material fed by said feeding means, electric circuit means, a reversible electric motor in said circuit means, one-way driving means for connecting said motor to said feeding means, one-way single revolution driving means for connecting said motor to said severing means, means in said circuit comprising a timing device for effecting operation of said motor to actuate said feeding means for a predetermined period and for thereafter effecting operation of said motor in the opposite direction for operating said severing means to sever an exposed portion of said material, and switch means in said circuit means operated by said shutter means to initiate operation of said motor.

7. An automatic copying camera comprising means for holding a web of photographically sensitized sheet material, shutter means for exposing said material, means for feeding said material from said holding means to said exposing means, means for cutting off exposed material fed by said feeding means, electric circuit means, an electric motor in said circuit means, one-way driving means for connecting said motor to said feeding means, one-way single revolution driving means for connecting said motor to said severing means, means in said circuit comprising a timing device for effecting operation of said motor in one direction for a predetermined period to operate said feeding means and for thereafter effecting operation of said motor means in the opposite direction for operating said severing means to sever an exposed portion of said material, switch means in said circuit means operated by said shutter means to initiate operation of said motor, and switch means in said circuit means operated by said material severing means for terminating the operation of said motor.

8. An automatic copying camera having a focal plane comprising, a turntable provided with means for holding a supply of sheet material sensitized on both sides thereof, said turntable being rotatable to positions for exposing the opposite sides of said material in succession in said plane, means for feeding said material from said holding means to said plane, means for cutting off exposed material fed by said feeding means, a first element rotatable alternately in opposite directions, one-way driving means for connecting said element with said feeding means during rotation of said element in one of said directions of rotation only for driving said feeding means, a second element rotatable in the other of said directions only, driving means for connecting said second element with said cutting-off means, motor driving means connected to said first element for rotating the same in said opposite directions, one-way driving means connecting said elements for rotating said second element in the other of said directions through one revolution only, and means for reversing the direction of operation of said motor means to feed a predetermined length of said exposed material and thereafter cut off said length.

9. The combination of elements claimed in claim 8 wherein said turntable is provided with motor means for rotating the same and with means for controlling the direction of rotation thereof from one of said positions to the other thereof.

10. The combination of elements claimed in claim 8 comprising means for initiating rotation of said turntable from each of said positions thereof to the other and means for arresting said turntable in each of said positions.

11. The combination of elements claimed in claim 8 wherein said turntable is oscillated through an angle of 180° from one of said positions to the other thereof and back to initial position, and said turntable is provided with means operated thereby for reversing the direction of movement thereof.

12. An automatic copying camera having a focal plane comprising a supporting frame, a turntable rotatably mounted on said frame, means on said table for holding a supply of sensitized material, means on said table for feeding said material through the focal plane, optical elements for focusing on said material an image of the object to be copied, a shutter for exposing said material to said image, means on said table for severing an exposed portion of said material, electrical circuit means, an electrical motor on said table connected in said circuit means, one-way driving means connecting said motor with said feeding means, one-way, single revolution driving means connecting said motor with said severing means, means in said circuit comprising a timing device for controlling operation of said motor in one direction for a predetermined period to operate said feeding means and for thereafter controlling operation of said motor means in the opposite direction for operating said severing means, a second motor connected in said circuit means and provided with means for rotating said table, said shutter being provided with means in said circuit for initiating operation of said second motor to rotate said table in one direction, and means in said circuit means operated by said table for reversing the direction of operation of said second motor for returning said table to initial position.

13. An automatic copying camera having a focal plane comprising a supporting frame, a turntable rotatably mounted on said frame, means on said table for holding a supply of sensitized material, optical elements for focusing on said material an image of the object to be copied, shutter means for exposing said material to said image, means on said table for feeding said material through the focal plane, means on said table for severing an exposed portion of said material, electrical circuit means, an electrical motor on said table connected in said circuit means, one-way driving means connecting said motor with said feeding means, one-way, single revolution driving means connecting said motor with said severing means, means in said circuit comprising a timing device for controlling operation of said motor in one direction for a predetermined period to operate said feeding means and for thereafter controlling operation of said motor in the opposite direction for operating said severing means, a second motor connected in said circuit means and provided with means for rotating said table, said shutter means being provided with means in said circuit for initiating operation of said second motor to rotate said table in one direction, and means in said circuit means operated by said table for reversing direction of the operation of said second motor, said shutter means having means connected in said circuit for initiating operation of said second motor in said reversed direction for returning said table to initial position.

14. An automatic copying camera having a focal plane comprising a supporting frame, a turntable rotatably mounted on said frame, means on said table for holding a supply of sensitized material, means on said table for feeding said material through the focal plane, optical elements for focusing on said material an image of the object to be copied, a shutter for exposing said material to said image, means on said table for severing an exposed portion of said material, electrical circuit means, an electrical motor on said table connected in said circuit means, one-way driving means connecting said motor with said feeding means, one-way, single revolution driving means connecting said motor with said severing means, means in said circuit comprising a timing device for controlling operation of said motor in one direction for a predetermined period to operate said feeding means and for thereafter controlling operation of said motor means in the opposite direction for operating said severing means, means in said circuit means operated by said shutter for initiating operation of said table motor, a second motor on said frame connected in said circuit means, said shutter being provided with means connected in said circuit means for initiating operation of said second motor to rotate said table in one direction, and means in said circuit means operated by said table for reversing the direction of operation of said second motor for returning said table to initial position.

15. An automatic copying camera having a focal plane comprising a supporting frame, a turntable rotatably mounted on said frame, means on said table for holding a supply of sensitized material, means on said table for feeding said material through the focal plane, optical elements for focusing on said material an image of the object to be copied, a shutter for exposing said material to said image, means on said table for severing an exposed portion of said material, electrical circuit means, an electrical motor on said table connected in said circuit means, one-way driving means connecting said motor with said feeding means, one-way, single revolution driving means connecting said motor with said severing means, means in said circuit comprising a timing device for controlling operation of said motor in one direction for a predetermined period to operate said feeding means and for thereafter controlling operation of said motor means in the opposite direction for operating said severing means, a second motor connected in said circuit means and provided with means for rotating said table, said shutter being provided with means in said circuit for initiating operation of said second motor to rotate said table in one direction, means in said circuit means operated by said table for reversing the direction of operation of said second motor for returning said table to initial position, and means in said circuit means operated by the driving means for said severing means for terminating operation of said motors.

16. An automatic copying camera having a focal plane comprising a supporting frame, a turntable rotatably mounted on said frame, means on said table for holding a supply of sensitized material, means on said table for feeding said material through the focal plane, optical elements for focusing on said material an image of the object to be copied, a shutter for exposing said material to said image, means on said table for severing an exposed portion of said material, electrical circuit means, an electrical motor on said table connected in said circuit means, one-way driving means connecting said motor with said feeding means, one-way, single revolution driving means connecting said motor with said severing means, means in said circuit comprising a timing device for controlling operation of said motor in one direction for a predetermined period to operate said feeding means and for thereafter controlling operation of said motor means in the opposite direction for operating said severing means, means in said circuit means operated by said shutter for initiating operation of said table motor, a second motor on said frame connected in said circuit means, said shutter being provided with means connected in said circuit means for initiating operation of said second motor to rotate said table in one direction, means in said circuit means operated by said table for reversing the direction of operation of said second motor for returning said table to initial position, and means in said circuit means operated by the driving means for said severing means for terminating the operation of said motors.

References Cited in the file of this patent

UNITED STATES PATENTS

| | | |
|---|---|---|
| 1,728,102 | Caps | Sept. 10, 1929 |
| 1,800,007 | Caps | Apr. 7, 1931 |
| 1,818,462 | Caps | Aug. 11, 1931 |
| 2,015,803 | Landrock | Oct. 1, 1935 |
| 2,043,004 | Lloyd et al. | June 2, 1936 |
| 2,236,712 | Landrock et al. | Apr. 1, 1941 |
| 2,319,882 | Reagan et al. | May 25, 1943 |
| 2,369,247 | Pratt | Feb. 13, 1945 |